United States Patent
Berkovitch et al.

(10) Patent No.: US 7,630,865 B2
(45) Date of Patent: Dec. 8, 2009

(54) COMPLEX ANALYSIS OF KINEMATICS FOR NON-HYPERBOLIC MOVEOUT CORRECTIONS

(75) Inventors: Alexander Berkovitch, Barkan (IL); Nathan Scharff, Modi'in (IL); Igor Belfer, Bat-Yam (IL)

(73) Assignee: Geomage (2003) Ltd, Modi'in (IL)

( * ) Notice: Subject to any disclaimer, the term of this patent is extended or adjusted under 35 U.S.C. 154(b) by 57 days.

(21) Appl. No.: 11/900,243

(22) Filed: Sep. 11, 2007

(65) Prior Publication Data

US 2009/0067287 A1    Mar. 12, 2009

(51) Int. Cl.
H03F 1/26 (2006.01)
(52) U.S. Cl. ...................................................... 702/189
(58) Field of Classification Search ................. 702/189, 702/14; 367/59
See application file for complete search history.

(56) References Cited

U.S. PATENT DOCUMENTS

| | | | |
|---|---|---|---|
| 4,760,563 A | 7/1988 | Beylkin | |
| 4,878,205 A | 10/1989 | Gelchinsky | |
| 4,935,905 A * | 6/1990 | Gassaway | 367/59 |
| 5,103,429 A | 4/1992 | Gelchinsky | |
| 5,563,949 A | 10/1996 | Bahorich et al. | |
| 5,724,309 A | 3/1998 | Higgs et al. | |
| 5,831,935 A | 11/1998 | Luo et al. | |
| 5,892,732 A | 4/1999 | Gersztenkorn | |
| 5,920,828 A * | 7/1999 | Norris et al. | 702/14 |
| 5,987,388 A | 11/1999 | Crawford et al. | |
| 6,018,498 A | 1/2000 | Neff et al. | |
| 6,263,284 B1 * | 7/2001 | Crider et al. | 702/14 |
| 6,636,809 B1 | 10/2003 | Herrmann | |

(Continued)

FOREIGN PATENT DOCUMENTS

WO    2008111037 A2    9/2008

(Continued)

OTHER PUBLICATIONS

Chira Oliva, et al., "Z-D ZO CRS Stack by Considering an Acquisition Line with Smooth Topography", Revista Brasileira de Geofisica 23:1 (2005), pp. 1-18.

(Continued)

Primary Examiner—Tung S Lau
Assistant Examiner—Xiuquin Sun
(74) Attorney, Agent, or Firm—Husch Blackwell Sanders Welsh & Katz; Gerald T. Shekleton

(57) ABSTRACT

A computer-implemented method for processing data includes receiving a collection of traces corresponding to signals received over time at multiple locations due to reflection of seismic waves from subsurface structures. A measure of correlation among the traces as is computed a function of a set of wavefront parameters, which determine respective moveout corrections to be applied in aligning the traces. A matrix having at least three dimensions is generated, wherein the elements of the matrix include the computed measure of the correlation. Using the matrix, values of the wavefront parameters are identified automatically or interactively along the time axis or along selected horizons to maximize the measure of the correlation, and a seismic image of the subsurface structures is generated by aligning and integrating the traces using the moveout corrections that are determined by the identified values of the wavefront parameters.

22 Claims, 8 Drawing Sheets

U.S. PATENT DOCUMENTS

| | | | |
|---|---|---|---|
| 6,832,161 | B1 | 12/2004 | Moore |
| 7,069,149 | B2 | 6/2006 | Goff et al. |
| 7,085,195 | B2 | 8/2006 | Taner et al. |
| 2005/0222774 | A1* | 10/2005 | Dulac et al. ............... 702/14 |
| 2006/0155476 | A1 | 7/2006 | Abma |
| 2006/0155477 | A1 | 7/2006 | Matson et al. |
| 2007/0131411 | A1 | 6/2007 | Vinegar et al. |

FOREIGN PATENT DOCUMENTS

| | | |
|---|---|---|
| WO | 2009034567 A2 | 3/2009 |

OTHER PUBLICATIONS

Hertweck, et al., "Data Stavking Beyond CMP", the Leading Edge 26:7 (2007), pp. 818-827.

Rupert, G.B., et al., "The block move sum normal moveout correction", Geophysics, Soc. Of Expl. Geopys., 40, 17-24, 1975.

Yilmaz, O., Seismic Data Processing, 1987, Society of Exploration Geophysics, Tulsa, Okla., pp. 166-183.

Eric de Bazelaire, 1988, "Normal moveout revisited: Inhomogeneous media and curved interfaces", Geophysics, vol. 53, No. 2, Feb. 1988, pp. 143-157.

Yelmaz, O, 1989. "Velocity-stack processing", Geophysical Prospecting, 37, 351-382.

Byun, B.S., et al., 1989, "Anisotropic velocity analysis for lithology discrimination", Geophysics, 54, 1564-1574.

Gidlow, P.M. et al., 1990, "Preserving far offset seismic data using non-hyperbolic moveout correction", Expanded Abstracts of 60$^{th}$ Ann. Int. SEG Mtg., 1726-1729.

Tsvankin, I. et al., 1994, "Non-hyperbolic reflection moveout in anisotropic media", Geophysics, 59, 1290-1304.

Shatilo, A. et al., 2000, "Constant normal-moveout (CNMO) correction. A technique and test results", Geophysics Prosp., Eur. Assn. Geosci. Eng., 48, 473-488.

Hicks, G.J. 2001, "Removing NMO stretch using the radon and fourier transforms", 63$^{rd}$ Mtg.: Eur. Assn. Of Expl. Geophysics Session: A-18.

Berkovitch, A. et al., "Basic formula for multifocusing stack" 56$^{th}$ Mtg. Eur. Assoc. Expl. Geophysics Expanded Abstracts, 1994/P.140.

Berkovitch, A, "The multifocusing method for homeomorphic imaging and stacking of seismic data", Doctoral Thesis, Tel Aviv University, Oct. 1995.

International Application PCT/IL2008/001147 Search Report dated Feb. 09, 2009.

U.S. Appl. No. 11/900,243 Official Action dated Mar. 18, 2009.

Landa et al., "Seismic monitoring of diffracted images for detection of local heterogeneities", Geophysics, vol. 63, No. 3m pp. 1093-1100, Society of Exploration Geophysicists, May-Jun. 1998.

Taner et al., "Separation and imaging of seismic diffraction using plane-wave decomposition", pp. 2401-2405, International Exposition and 66th Annual Meeting, Society of Exploration Geophysicists, New Orleans, USA, Oct. 1-6, 2006.

International Application PCT/IL2007/000312 Search Report dated Sep. 10, 2008.

International Application PCT/IL2009/000201 Search Report dated May 14, 2009.

International Application PCT/IL2009/000201 "Wavefront-Defined Radon Transform" filed on Feb. 22, 2009.

Thamban Nair et al., "The Trade-off Between Regularity and Stability in Tikhonov Regularization", Mathematics and Computation, vol. 66, No. 217, pp. 193-206, American Mathematical Society, Jan. 1997.

Hugonnet et al., "High Resolution Radon: a Review", IM2, Eage 63rd Conference and Technical Exhibition, Amsterdam, The Netherlands, Jun. 11-15, 2001.

Fomel, Sergey, "Least-Square Inversion with Inexact Adjoins. Method of Conjugate Directions: a Tutorial", Stanford Exploration Project (SEP) report SEP92, pp. 13-25, Nov. 09, 2000.

Trad et al., "Accurate Interpolation with High-Resolution Time-Variant Radon Transforms", Geophysics, vol. 67, No. 2, pp. 644-656, Society of Exploration Geophysicists, Mar.-Apr. 2002.

Beylkin, Gregory, "Discrete Radon Transform", IEEE Transactions on Acoustics, Speech and Signal Processing, vol. ASSP-35, No. 2, pp. 162-172, Feb. 1987.

Hampson, Dan, "Inverse Velocity Stacking for Multiple Elimination", Journal of the Canadian Society of Exploration Geophysicists, vol. 22, No. 1, pp. 44-55, Dec. 1986.

Mitchell et al., "Efficient Tau-p. Hyperbolic Velocity Filtering", Geophysics, vol. 55, No. 5, pp. 619-625, Society of Exploration Geophysicists, May 1990.

Foster et al., "Suppression of Multiple Reflections using the Radon Transform", Geophysics, vol. 57, No. 3, pp. 386-395, Society of Exploration Geophysicists, Mar. 1992.

Treitel et al., "Plane-Wave Decomposition of Seismograms", Geophysics, vol. 47, No. 10, pp. 1375-1401, Society of Exploration Geophysicists, Oct. 1982.

Thorson et al., "Velocity-Stack and Slant-Stack Stochastic Inversion", Geophysics, vol. 50, No. 12, pp. 2727-2741, Society of Exploration Geophysicists, Dec. 1985.

Yilmaz, O., "The Radon Transform", pp. 938-948, Seismic Data Analysis, Society of Exploration Geophysics, 1987.

Berkovitch et al., U.S. Appl. No. 12/080,218, "Wavefront-Defined Radon Transform" filed on Apr. 01, 2008 (not yet published).

* cited by examiner

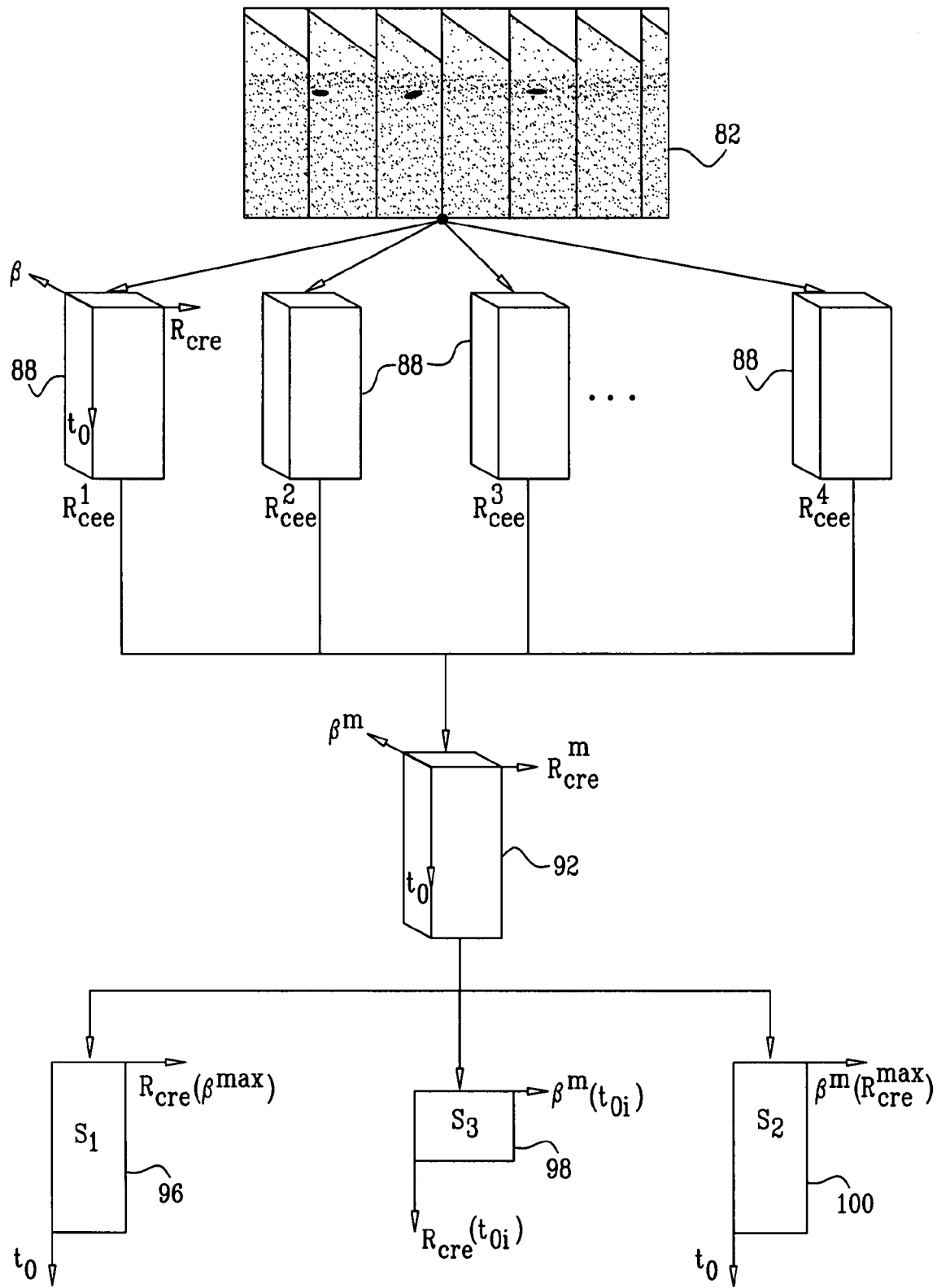

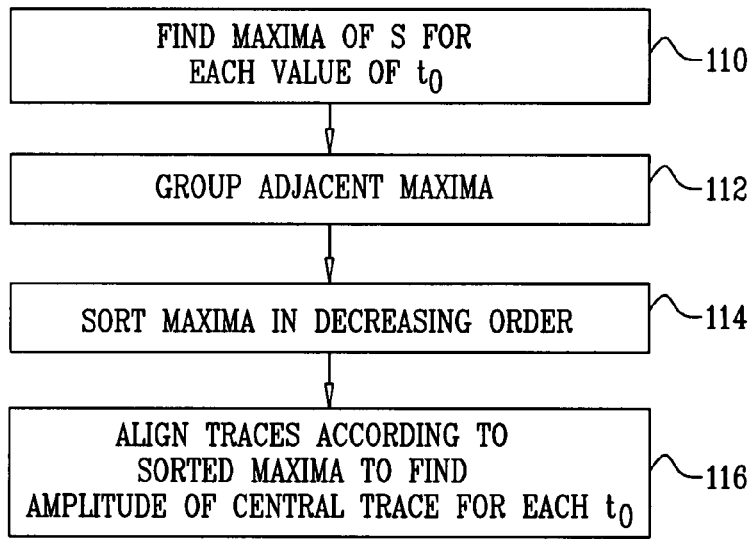
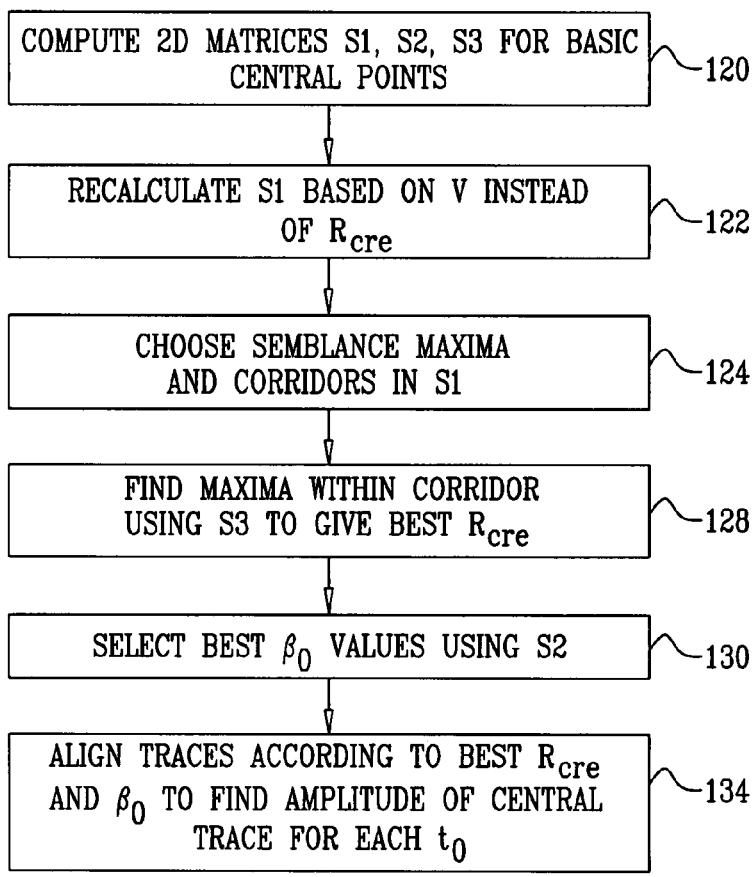

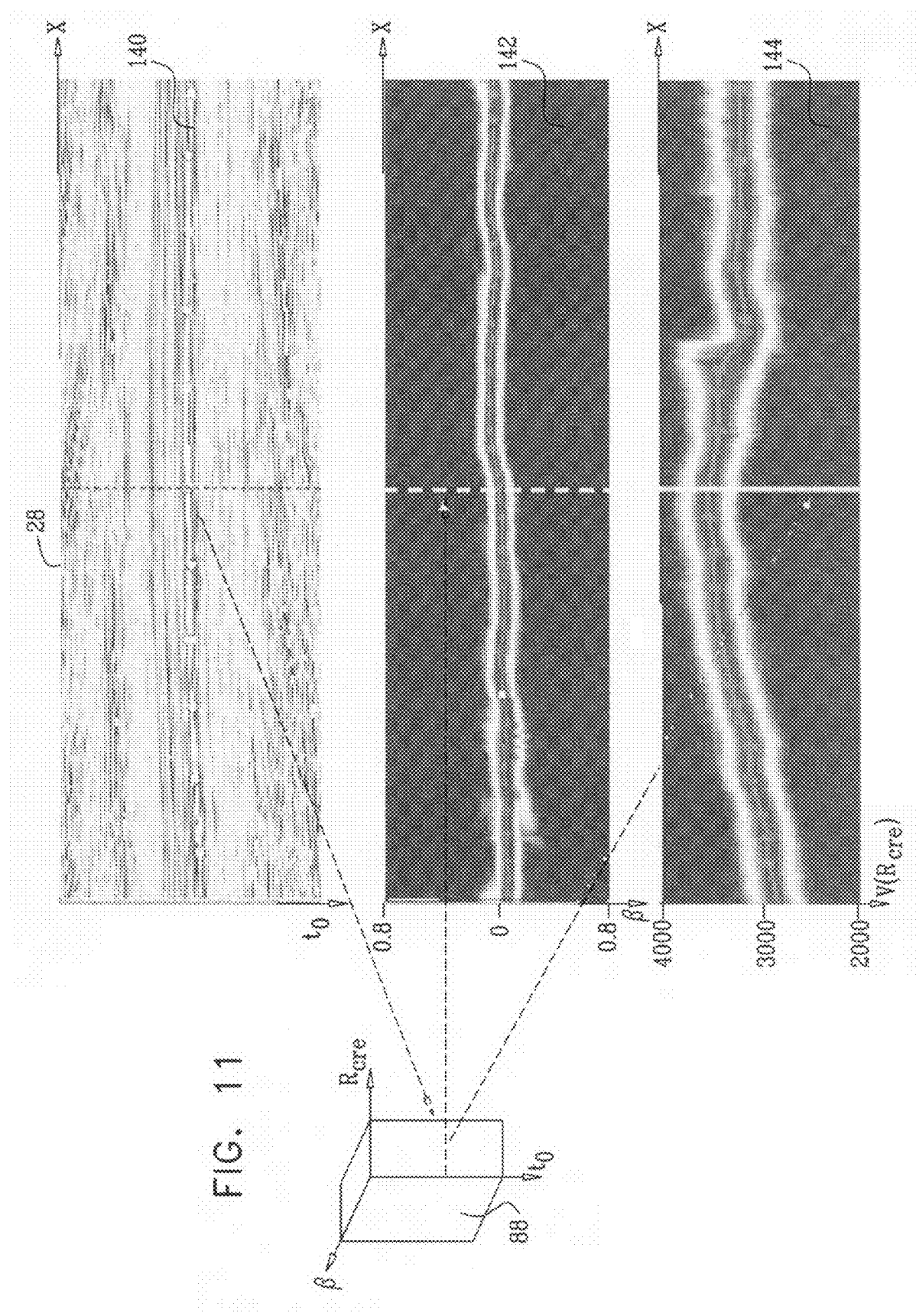

COMPLEX ANALYSIS OF KINEMATICS FOR NON-HYPERBOLIC MOVEOUT CORRECTIONS

FIELD OF THE INVENTION

The present invention relates generally to analyzing the structure of a medium, and specifically to processing of seismic data to analyze subterranean structures.

BACKGROUND OF THE INVENTION

Methods of seismic imaging that are known in the art use an array of seismic sources and receivers to acquire data regarding subsurface (i.e., subterranean) structures. Following a seismic stimulus (such as a detonation or mechanical shock) at a given source, each of the receivers produces a seismogram trace, i.e., a record of the seismic signal at the receiver as a function of time, due to reflections of the stimulus wave from the subsurface layers below the array. The traces from multiple receivers due to stimuli by sources at different locations are processed together in order to create an image of the layers.

As part of the imaging process, in order to increase signal/noise ratio, multiple traces from source/receiver pairs surrounding a common midpoint (CMP) are temporally aligned and then summed. (A group of traces of this sort is commonly referred to as a "gather," and the processes of aligning and summation the traces are known as normal moveout (NMO) correction and stacking.) The alignment is meant to take into account the differences in the travel times of seismic waves between different source/receiver pairs. The dependence of travel time is commonly assumed to be hyperbolic as a function of the distance between the source and receiver, and the time shift that is applied to align the traces in order to compensate for this hyperbolic dependence is calculated by a simple formula that includes the distance between source and receiver and the velocity of waves in the media.

The assumption of hyperbolic moveout, however, is known to be an inaccurate reflection of the actual characteristics of subterranean structures, and its application leads to loss of information. Consequently, a number of alternative approaches have been proposed to provide the correct alignment between gathers of traces. For example, U.S. Pat. No. 5,103,429, whose disclosure is incorporated herein by reference, describes a method for analyzing such structures using homeomorphic imaging. (In a homeomorphic image, each element of a target is mapped one-to-one to a corresponding element of its image, so that the target object and its image are topologically equivalent.) This method is said to allow many types of stacks and corresponding images to be constructed without loss of resolution.

SUMMARY OF THE INVENTION

Embodiments of the present invention that are described hereinbelow apply the principles of homeomorphic imaging in processing a group of gathers of seismic signal traces, referred to herein as a "supergather." The analysis finds moveout corrections adaptively, in a process of complex kinematic analysis, based on parameterization of wavefronts propagating in the subterranean medium. The traces are stacked using these moveout corrections in order to generate an image of the medium, with greater accuracy and detail than are achievable using methods known in the art. These methods described hereinbelow not only increase the signal/noise ratio of subsurface images, but also take into account factors such as changes of velocities in both shallow and deep subsurface regions and curvature of reflecting subsurface layers, as well as avoiding "stretching" effects that occur in methods of moveout correction that are known in the art.

Although the embodiments described hereinbelow make reference specifically to processing of seismic data and imaging of subsurface structures, the principles of the present invention may similarly be applied in imaging of inhomogeneous media of other sorts.

There is therefore provided, in accordance with an embodiment of the present invention, a computer-implemented method for processing data, including:

receiving a collection of traces corresponding to signals received over time at multiple locations due to reflection of seismic waves from subsurface structures;

computing a measure of correlation among the traces as a function of a set of wavefront parameters, which determine respective moveout corrections to be applied in aligning the traces;

generating a matrix having at least three dimensions, wherein one of the dimensions corresponds to propagation times of the seismic waves and at least two of the dimensions correspond respectively to at least two of the wavefront parameters, and the elements of the matrix include the computed measure of the correlation;

identifying, using the matrix, values of the wavefront parameters that maximize the measure of the correlation for each of a plurality of propagation times, respectively; and generating a seismic image of the subsurface structures by aligning and integrating the traces using the moveout corrections that are determined by the identified values of the wavefront parameters.

In a disclosed embodiment, receiving the collection of traces includes receiving a supergather of the traces, including multiple gathers of the traces having different, respective sources and receivers in a two-dimensional or three-dimensional acquisition geometry, and identifying the values includes processing the measure of the correlation computed over the multiple gathers in order to identify the values of the wavefront parameters that maximize the measure of the correlation. Typically, receiving the supergather includes selecting multiple gathers, each including a respective set of the traces for which the sources and receivers define a different acquisition geometry, and generating the seismic image of the subsurface structures includes computing respective seismic images in two or three dimensions corresponding to the gathers.

Typically, the moveout corrections are determined by an approximation that is selected from a set of approximations consisting of hyperbolic, non-hyperbolic and parabolic approximations.

In some embodiments, the at least two of the wavefront parameters include an angular parameter and at least one radius of curvature of a wavefront outgoing from a subsurface reflector. In one embodiment, the angular parameter includes an emergence angle, and the at least one radius of curvature includes respective radii of a common reflected element and a common evolute element of the wavefronts.

Typically, identifying the values includes generating multiple multidimensional matrices, each having at least three dimensions and containing the computed measure of the correlation for a different, respective value of the radius of the common evolute element, and combining the multiple multidimensional matrices to generate a resultant multidimensional matrix for which the at least two of the dimensions include a first dimension corresponding to the emergence angle and a second dimension corresponding to the radius of the common reflected element. In a disclosed embodiment, combining the multiple multidimensional matrices includes inserting in the elements of the resultant multidimensional matrix the computed measure of the correlation that are maximal over the corresponding elements in the multiple multidimensional matrices. Additionally or alternatively, identifying the values includes slicing the resultant multidimensional matrix to derive multiple two-dimensional matrices, and finding maxima of the computed measure of the correlation in the two-dimensional matrices.

In a disclosed embodiment, the at least two of the wavefront parameters include an angular parameter and at least one of a wavefront curvature parameter and a velocity parameter.

In some embodiments, identifying the values includes finding one or more respective maxima of the computed measure of the correlation for each of the propagation times, and aligning the traces includes aligning the traces according to the values of the wavefront parameters corresponding to the respective maxima. Finding the one or more respective maxima may include sorting the maxima in order of the computed measure of the correlation at each of the maxima. Additionally or alternatively, finding the one or more respective maxima may include grouping the maxima for each of the propagation times for which the values of the wavefront parameters differ by no more than a predetermined threshold as corresponding to a single wave, while identifying the maxima for which the values of the wavefront parameters differ by more than the predetermined threshold as corresponding to different waves, and aligning the traces includes aligning the traces according to the values of the wavefront parameters for at least one of the different waves.

In some embodiments, identifying the values includes displaying an output that shows the computed measure of the correlation as a function of the propagation times and at least one of the wavefront parameters, and receiving an input from a user that identifies one or more maxima of the computed measure of the correlation. Typically, receiving the input includes receiving a selection by the user of a corridor containing a plurality of the maxima at different propagation times and corresponding values of the at least one of the wavefront parameters, wherein the maxima in the corridor correspond to waves reflected respectively from successive subsurface layers.

In another embodiment, the method includes defining a spatial horizon within a region of the seismic image, and identifying, using the matrix, values of the wavefront parameters that maximize the measure of the correlation for each of a plurality of locations along the spatial horizon, respectively.

There is also provided, in accordance with an embodiment of the present invention, apparatus for processing data, including:

an interface, which is coupled to receive a collection of traces corresponding to signals received over time at multiple locations due to reflection of seismic waves from subsurface structures; and a signal processor, which is configured to compute a measure of correlation among the traces as a function of a set of wavefront parameters, which determine respective moveout corrections to be applied in aligning the traces, to generate a matrix having at least three dimensions, wherein one of the dimensions corresponds to propagation times of the seismic waves and at least two of the dimensions correspond respectively to at least two of the wavefront parameters, and the elements of the matrix include the computed measure of the correlation, to identify, using the matrix, values of the wavefront parameters that maximize the measure of the correlation for each of a plurality of propagation times, respectively, and to generate a seismic image of the subsurface structures by aligning and integrating the traces using the moveout corrections that are determined by the identified values of the wavefront parameters.

There is additionally provided, in accordance with an embodiment of the present invention, a computer software product, including a computer-readable medium in which program instructions are stored, which instructions, when read by a computer, cause the computer to receive a collection of traces corresponding to signals received over time at multiple locations due to reflection of seismic waves from subsurface structures, to compute a measure of correlation among the traces as a function of a set of wavefront parameters, which determine respective moveout corrections to be applied in aligning the traces, to generate a matrix having at least three dimensions, wherein one of the dimensions corresponds to propagation times of the seismic waves and at least two of the dimensions correspond respectively to at least two of the wavefront parameters, and the elements of the matrix include the computed measure of the correlation, to identify, using the matrix, values of the wavefront parameters that maximize the measure of the correlation for each of a plurality of propagation times, respectively, and to generate a seismic image of the subsurface structures by aligning and integrating the traces using the moveout corrections that are determined by the identified values of the wavefront parameters.

The present invention will be more fully understood from the following detailed description of the embodiments thereof, taken together with the drawings in which:

BRIEF DESCRIPTION OF THE DRAWINGS

FIG. 6 is a block diagram that schematically illustrates data structures used in the method of FIG. 5, in accordance with an embodiment of the present invention;

FIG. 8 is a flow chart that schematically illustrates a method for complex kinematic analysis of seismic traces, in accordance with an embodiment of the present invention;

FIG. 9 is a flow chart that schematically illustrates a method for complex kinematic analysis of seismic traces, in accordance with another embodiment of the present invention;

FIG. 11 is a schematic, graphical representation of data structures used in another method for complex kinematic analysis of seismic traces, in accordance with an embodiment of the present invention.

DETAILED DESCRIPTION OF EMBODIMENTS

Figure 1:
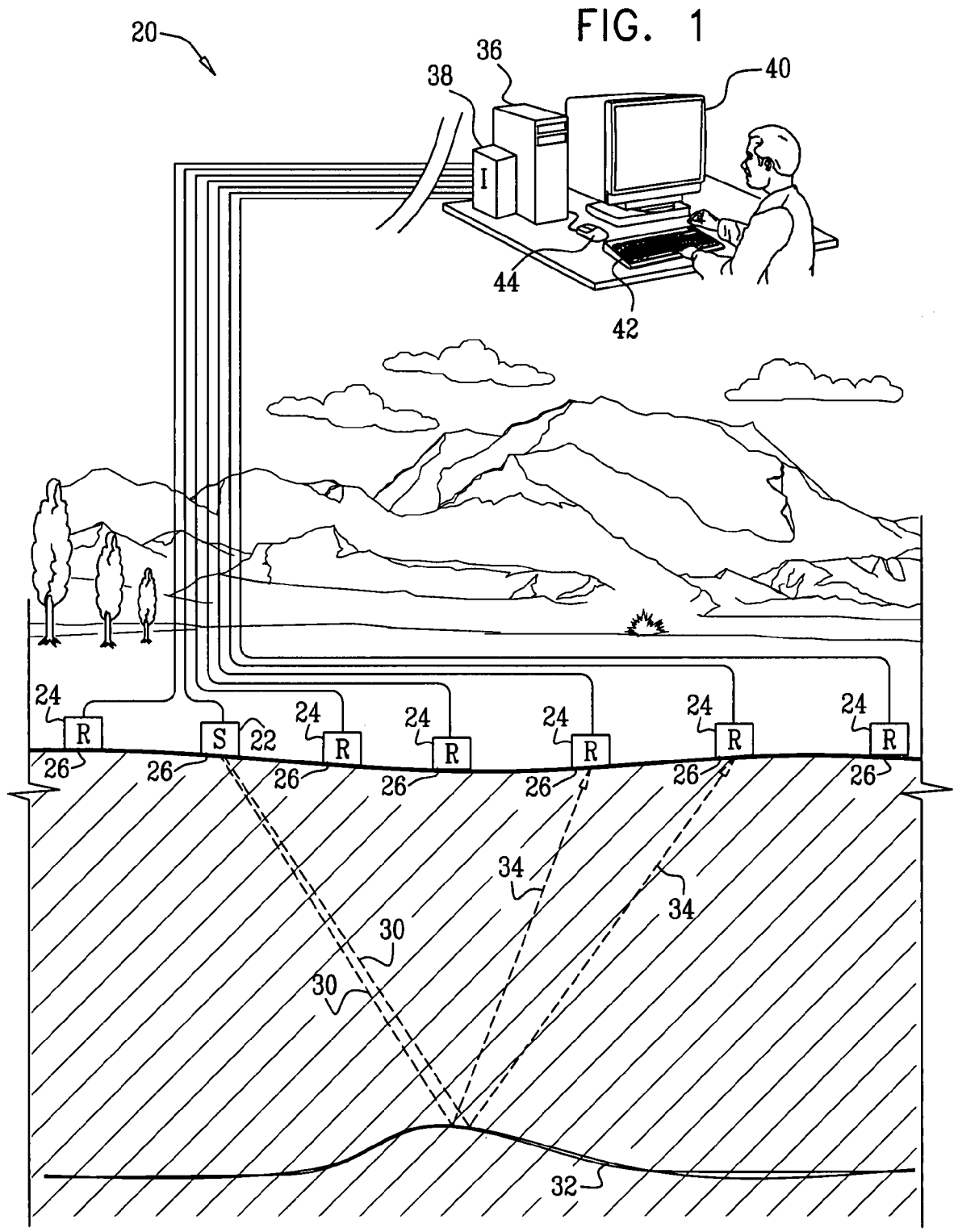
FIG. 1 is a schematic, pictorial illustration of a system for seismic imaging, in accordance with an embodiment of the present invention.

FIG. 1 is a schematic, pictorial illustration of a system 20 for seismic imaging, in accordance with an embodiment of the present invention. Multiple sources 22 and receivers 24 of seismic signals are distributed at an array of locations 26 on a terrestrial surface 28 overlying a subterranean region of interest. Typically, sources 22 comprise explosive charges, which are detonated at specified times, while receivers 24 comprise seismic sensors, which generate seismogram traces indicating the amplitude of seismic waves reaching the respective locations 26 as a function of time. Although the sources and receivers are shown in FIG. 1, for the sake of simplicity, as lying along a single line (thus defining a two-dimensional acquisition geometry), system 20 typically comprises an array of sources and receivers that are distributed over an area of the terrestrial surface, and may thus use both two-dimensional and three-dimensional acquisition geometries.

For example, as shown in the figure, a seismic stimulus (such as a detonation or mechanical shock) at source 22 causes waves with ray trajectories 30 to propagate down into the earth below surface 28. These waves reflect from a subterranean structure 32, such as an interface between layers of different materials. Reflected waves with ray trajectories 34 propagate back to surface 28, where they are sensed by receivers 24. The waves reflected from a given structure reach different sensors at different times due to the different distances that the waves must traverse underground, as well as to variations in the shape of structure 32 and in the intervening layers between the reflecting structure and surface 28.

A signal processor 36 receives the traces generated by receivers 24 via a suitable interface 38. This interface may be configured to control the generation of stimuli and to receive signals from surface 28 in real time, or it may alternatively receive a record of the traces from appropriate data logging equipment (not shown). Processor 36 typically comprises a general-purpose computer, which is programmed in software to carry out the functions that are described herein. This software may be downloaded to the computer in electronic form, over a network, for example, or it may alternatively be provided on tangible media, such as optical, magnetic or electronic memory media. Alternatively, at least some of the functions of processor 36 may be performed by a suitable digital signal processor (DSP) device or other sorts of dedicated or programmable processing hardware. Processor 36 is typically coupled to output seismic data and images via an output device, such as a display 40. For purposes of user interaction, processor 36 may be coupled to one or more user input devices, such as a keyboard 42 and/or a pointing device 44.

In order to create a seismic image of the region below surface 28, processor 36 applies principles of homeomorphic imaging to supergathers of seismograms from receivers 24. The supergather may comprise a collection of common shot gathers (i.e., traces generated due to a single stimulus), common receiver gathers (traces generated by a single receiver due to different stimuli), and/or CMP-based gathers, as defined above. The concepts and conventions that are applied by the processor in producing images of subsurface structures are explained hereinbelow with reference to FIGS. 2-4.

Figure 2:
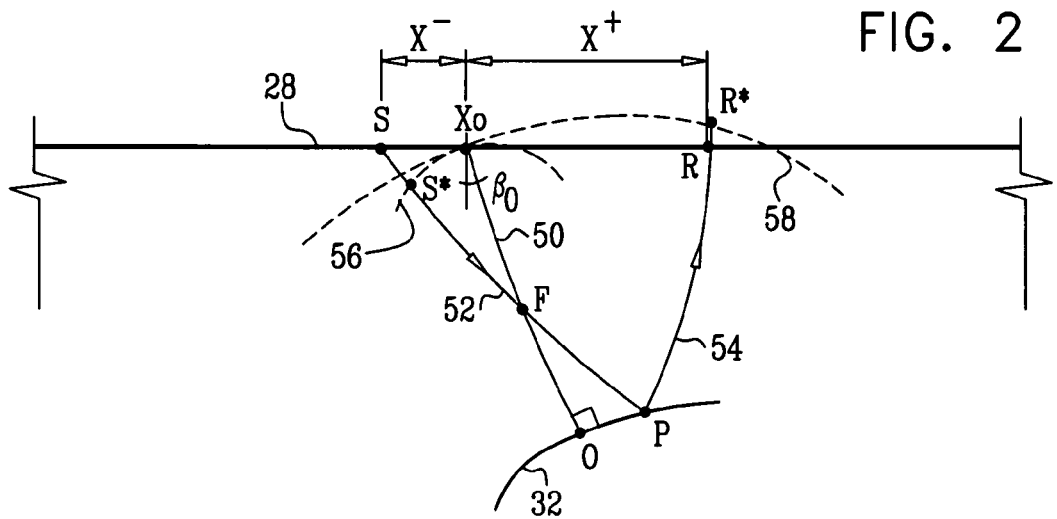
FIGS. 2-4 are schematic, sectional views of a subsurface region showing parameters used in representing seismic waves propagating through the region, in accordance with an embodiment of the present invention.

FIG. 2 is a schematic, sectional view of a subterranean region below surface 28, showing propagation of exemplary seismic waves through the region, in accordance with an embodiment of the present invention. This figure shows some of the parameters used in computing moveout corrections with respect to structure 32 for all gathers of a supergather around a central point $X_0$. The moveout is to be computed here for an arbitrary source point S and receiver point R, which are located on surface 28 at respective distance $X^-$ and $X^+$ from point $X_0$. Although this embodiment (and the embodiments throughout this application) is illustrated for the sake of simplicity in two-dimensional X-Z space, the principles of these embodiments may be extended in a straightforward manner to the three-dimensional space in which seismic imaging is typically performed.

A central ray 50 from $X_0$ is defined as the ray that is normally incident on structure 32, at a point marked O in the figure. Ray 50 leaves and returns to surface 28 at an emergence angle $\beta_0$ relative to the normal to the surface. A seismic ray 52 from point S reflects from structure 32 at a point P and returns as a reflected ray 54 to point R. In this example, ray 52 intersects ray 50 at a point F. The set of rays 50, 52 and 54 can thus be modeled as a focusing wave, which converges from a wavefront 56 to point F, and then reflects from structure 32 to strike surface 28 along a diverging wavefront 58. Wavefronts 56 and 58 intersect rays 52 and 54 at points S* and R*, respectively.

Rays 52 and 54 are part of a "supergather," which comprises multiple gathers of rays that cross ray 50 and have respective sources and receivers on either side of the central point $X_0$. A supergather of this sort may be used, as described in detail hereinbelow, in a technique that is used to search for values of wavefront parameters in the vicinity of central ray 50. This technique is determines real and virtual foci of waves reflected from subsurface structures, and is therefore referred to herein as "multifocusing." Alternatively, other methods may be used in estimating the values of these waveform parameters.

Assuming the propagation velocity of seismic waves in the region of interest to be uniform, the transit times of the seismic wave along the ray segments S*F and $FX_0$ are equal, i.e., $t_{S*F} = t_{FX_0}$, as are the transit times along the segments S*PR and $X_0 O X_0$: $t_{S*PR*} = t_{X_0 O X_0}$. The wave transit time from source S to receiver R may be expressed as:

$$t_{SPR} = t_{S*PR*} + t_{SS*} - t_{RR*} \tag{1}$$

The first term in this expression, $t_{S*PR*}$, is equal to the round-trip transit time along the central (zero-offset) ray $X_0 FO$. Time corrections $t_{SS*}$ and $t_{RR*}$ can be defined in terms of the near-surface velocity in the subterranean medium and parameters pertaining to the central ray, as explained hereinbelow.

Figure 3:
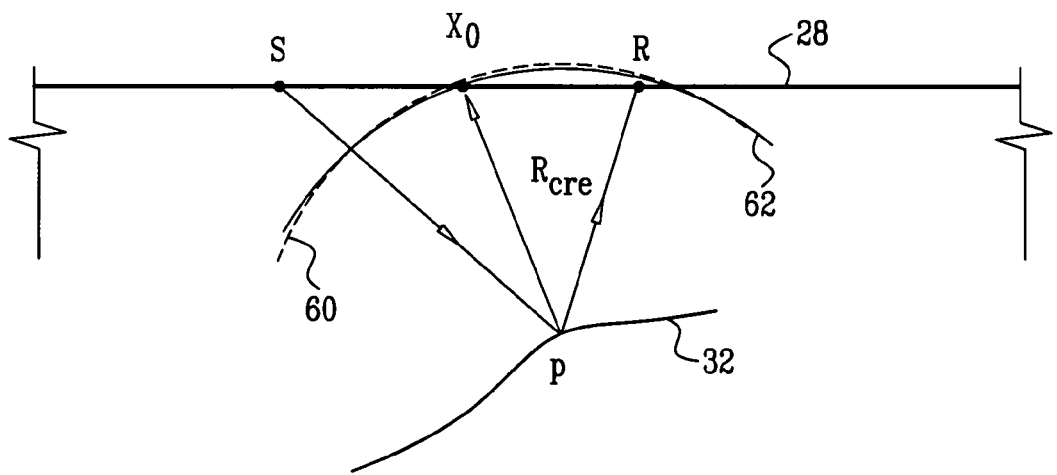
Figure 4:
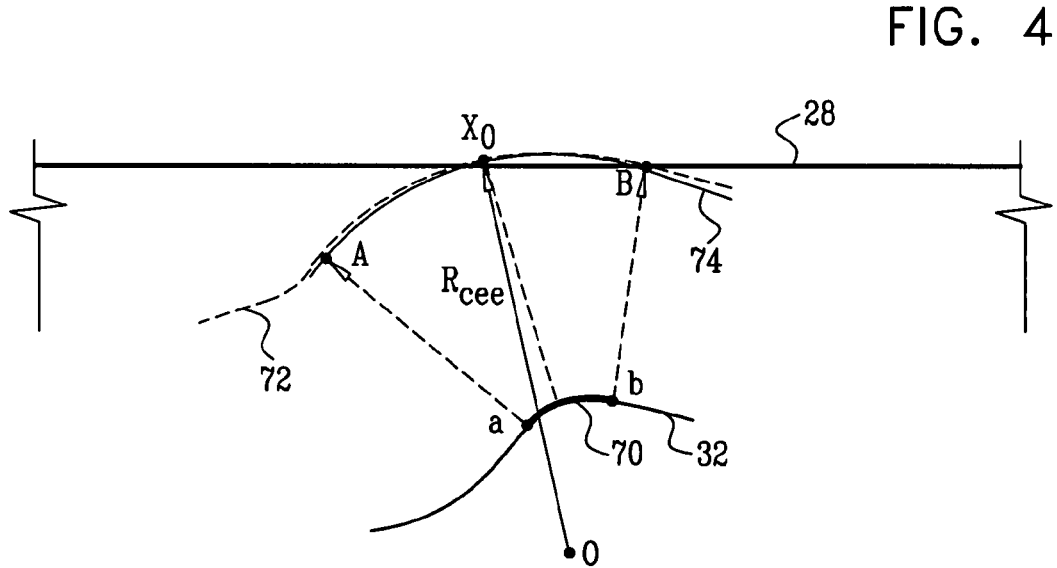

FIGS. 3 and 4 are schematic, sectional views of the subterranean region of FIG. 2, showing wavefront parameters used in computing local moveout corrections in the region, in accordance with an embodiment of the present invention. The computation uses a homeomorphic model, as described in the above-mentioned U.S. Pat. No. 5,103,429. In the embodiments that follow, these parameters include the emergence angle $\beta_0$, shown in FIG. 2 (which may equivalently be defined as the angle of entry); the wavefront radius of curvature $R_{cre}$ of the common reflected element (CRE) wave, illustrated in FIG. 3; and the wavefront radius of curvature $R_{cee}$ of the common evolute element (CEE, or normal wave), illustrated in FIG. 4.

As illustrated in FIGS. 2-4, the parameters $\beta_0$, $R_{cre}$ and $R_{cee}$ relate directly to the physical characteristics of structure 32. Alternatively, the wavefronts that are used in the homeomorphic model may be framed in terms of other angular and radial parameters, as will be apparent to those skilled in the art. The values of the wavefront parameters are not known a priori, but are rather used as the basis for a parametric model of subsurface structures. The parameter values are determined by fitting the actual trace data to the model in a process of complex kinematic analysis, which is described in detail hereinbelow.

As shown in FIG. 3, the wave reflected from point P on structure 32 creates a wavefront 60, which strikes surface 28. $R_{cre}$ is the radius of a circular (or spherical) arc 62 that approximates wavefront 60. This radius can be associated with the conventional stacking velocity in the subsurface region $V_{st}$ by the formula $$R_{cre} = \frac{V_{st}^2 t_0}{2V_0},$$

wherein $V_0$ is the average velocity of seismic waves near surface 28, and $t_0$ is the propagation time of a seismic wave along the segment $X_0P$.

Parameter $R_{cee}$, as shown in FIG. 4, is the radius of a circular (or spherical) arc 74 that approximates a CEE wavefront 72 propagating from a segment 70 of structure 32 to surface 28. CEE wavefront 72 is formed by normal rays emitted by different points, between points a and b, on segment 70. The resulting wavefront 72 between corresponding points A and B is thus defined by the shape of structure 32. $R_{cee}$ models this shape in terms of a virtual center O from which the wavefront radiates.

Returning now to equation (1), the time correction terms may be expressed as follows in terms of the geometrical parameters shown in FIG. 2:

$$t_{SS^*} = \frac{\sqrt{(R_s)^2 + 2\sin(\beta_0)R_s X^-} - R_s}{V_s} \quad (2)$$

$$t_{RR^*} = \frac{\sqrt{(R_r)^2 - 2\sin(\beta_0)R_r X^+} - R_r}{V_r} \quad (3)$$

In these expressions, $R_s$ and $R_r$ are the radii of wavefronts 56 and 58, respectively, while $V_s$ and $V_r$ are the near-surface seismic velocities near the source and receiver, respectively.

Assuming constant near-surface velocity, i.e., $V_s=V_r=V_0$, equations (2) and (3) can be combined and recast as follows in terms of $\beta_0$, $R_{cre}$ and $R_{cee}$, to give the moveout correction $\Delta t$ for rays around the central point $X_0$. The formulas below were derived and presented by Berkovitch in "The Multifocusing Method for Homeomorphic Imaging and Stacking of Seismic Data" (Doctoral Thesis, Tel Aviv University, 1995), which is incorporated herein by reference:

$$\Delta \tau = t_{SS^*} - t_{RR^*} \quad (4)$$

$$= \frac{\sqrt{(R_s)^2 + 2\sin(\beta_0)R_s X^-} - R_s}{V_0} -$$

$$\frac{\sqrt{(R_r)^2 - 2\sin(\beta_0)R_r X^+} - R_r}{V_0}$$

$$X^+ = \frac{(1+\sigma)}{\cos(\beta_0)}Y + \frac{\sin(\beta_0)}{\cos^2(\beta_0)}(1+\sigma)\left(\frac{1}{R_{cee}} - \frac{\sigma}{R_{cre}}\right)^2 Y^2 \quad (5)$$

$$X^- = \frac{(1-\sigma)}{\cos(\beta_0)}Y + \frac{\sin(\beta_0)}{\cos^2(\beta_0)}(1-\sigma)\left(\frac{1}{R_{cee}} - \frac{\sigma}{R_{cre}}\right)^2 Y^2 \quad (6)$$

The focusing parameter $\sigma$ depends on the position of the point F where ray 52 or 54 crosses central ray 50 (FIG. 2). This parameter can be defined in terms of the radii as follows:

$$R_s = \frac{1-\sigma}{\frac{1}{R_{cee}} - \frac{\sigma}{R_{cre}}} \quad (7)$$

$$R_r = \frac{1+\sigma}{\frac{1}{R_{cee}} - \frac{\sigma}{R_{cre}}}$$

and changes relatively slowly with changes in $\beta_0$, $R_{cre}$ and $R_{cee}$. The choice of the parameter $\sigma$ defines the sorting rule to be applied to the traces. For example, for the case $X^+=0$ or $X^-=0$, equation (7) gives $\sigma=1$ or $\sigma=-1$ respectively. These cases correspond to common source and common receiver configurations. Intermediate values of $\sigma$ may be calculated by solution of equations (5) and (6).

Y is an asymmetric scaling factor, which is defined by the observation geometry. It is proportional to the spreading function (which is proportional to $X^{\pm}$) and to the angle of the wave reflection $\Delta\theta$: $Y \approx aX^{\pm}\Delta\theta$, wherein a is a constant of proportionality.

For a given gather of traces around a central point $X_0$, the values of $X^+$ and $X^-$ are known from the source and receiver locations for each trace, while the values of $\beta_0$, $R_{cre}$ and $R_{cee}$ depend on the unknown location and shape of the subterranean structures from which the seismic waves reflect. The correct combination of values of $\beta_0$, $R_{cre}$ and $R_{cee}$ will fit the trace data in the gather, in the sense that when the time offsets between the traces in the gather are corrected according to these values, the traces will have a high semblance (i.e., a high cross-correlation value) because the reflections from structure 32 will be temporally aligned and therefore well correlated. Processor 36 searches through ranges of combinations of $\beta_0$, $R_{cre}$ and $R_{cee}$ with $X_0$, $X^+$ and $X^-$ over the entire supergather, using a process referred to herein as complex kinematic analysis, in order to find the combinations that give the best fit to all of the traces. The resulting map of $\beta_0$, $R_{cre}$ and $R_{cee}$ characterizes the location and shape of structure 32, as well as of other structures within the subterranean region of interest. This process is described in detail hereinbelow.

Although the derivation above of the multifocusing model and the methods described below refer specifically to CMP gathers around a central point $X_0$, the methods described herein may similarly be applied, mutatis mutandis, to gathers of other types. For example, equation (4) and the associated parameter definitions may be restated for gathers of traces having a common shot or a common receiver. These alternative approaches are considered to be within the scope of the present invention.

The multifocusing method that is described above creates a one-to-one relationship between wavefront parameters and properties of subsurface reflectors. Alternatively, other approximating expressions and formulas may be used in calculating the above-mentioned parameters for the purpose of optimal stack construction. Some of these alternative methods may be regarded as a special case of the method described herein.

For example, Chira-Oliva et al. present the following formula for calculation of moveout correction in "2-D ZO CRS Stack by Considering an Acquisition Line with Smooth Topography" *Revista Brasileira de Geofísica* 23:1 (2005), pages 1-18, which is incorporated herein by reference:

$$t^2(x_m, h) = \left(t_0 + 2\frac{\sin\beta_0^*}{v_1}(x_m - x_0)\right)^2 + \quad \text{[equation (8)]}$$
$$\frac{2t_0}{v_1}\left(\frac{\cos^2\beta_0^*}{R_N} - \cos\beta_0^* K_0\right)(x_m - x_0) +$$
$$\frac{2t_0}{v_1}\left(\frac{\cos^2\beta_0^*}{R_{NIP}} - \beta_0^* K_0\right)h^2$$

Here t is the reflection time, $t_0$ is zero-offset time, $\beta_0^*$ is the emergence angle of the normal ray, $x_m$ is the midpoint coordinate, $x_0$ is the central point coordinate, $K_0$ is the local curvature of the earth's surface at a point on the acquisition line, h is the half-offset, $R_N$ is the radius of curvature at $x_0$ of a hypothetical N (normal) wavefront, and $R_{NIP}$ is the radius of curvature at $x_0$ of the hypothetical NIP (normal incidence point) wavefront. If the variables in equation (4) are given their equivalent meanings in the multifocusing model ($R_{cee}=R_N$, $R_{cre}=R_{NIP}$, $X^+=h$, $V_0=v_1$), and equation (4) is expanded into a Taylor series, it can be seen that equation (8) is simply a hyperbolic approximation of equation (4).

Another formula for moveout correction is given by Hertweck et al., in "Data Stacking Beyond CMP," *The Leading Edge* 26:7 (2007), pages 818-827, which is also incorporated herein by reference:

$$t^2(\Delta m, x) = t_0^2 + \frac{x^2}{v_{NMO}^2} + 4t_0 p\Delta m + 4\Delta m^2 p^2 + \frac{\Delta m^2}{v_{CMO}^2} \quad (9)$$

Recasting the variables in equation (9) as $p=\sin\beta_0^*/v_1$, $m=(x_m-x_0)$, $x=h$, $$v_{CMO} = \sqrt{\frac{2R_N v_1}{\cos\beta_0^* t_0}}, \text{ and } v_{NMO} = \sqrt{\frac{2R_{NIP} v_1}{\cos\beta_0^* t_0}},$$

this equation likewise becomes a hyperbolic approximation of equation (4).

Figure 5:
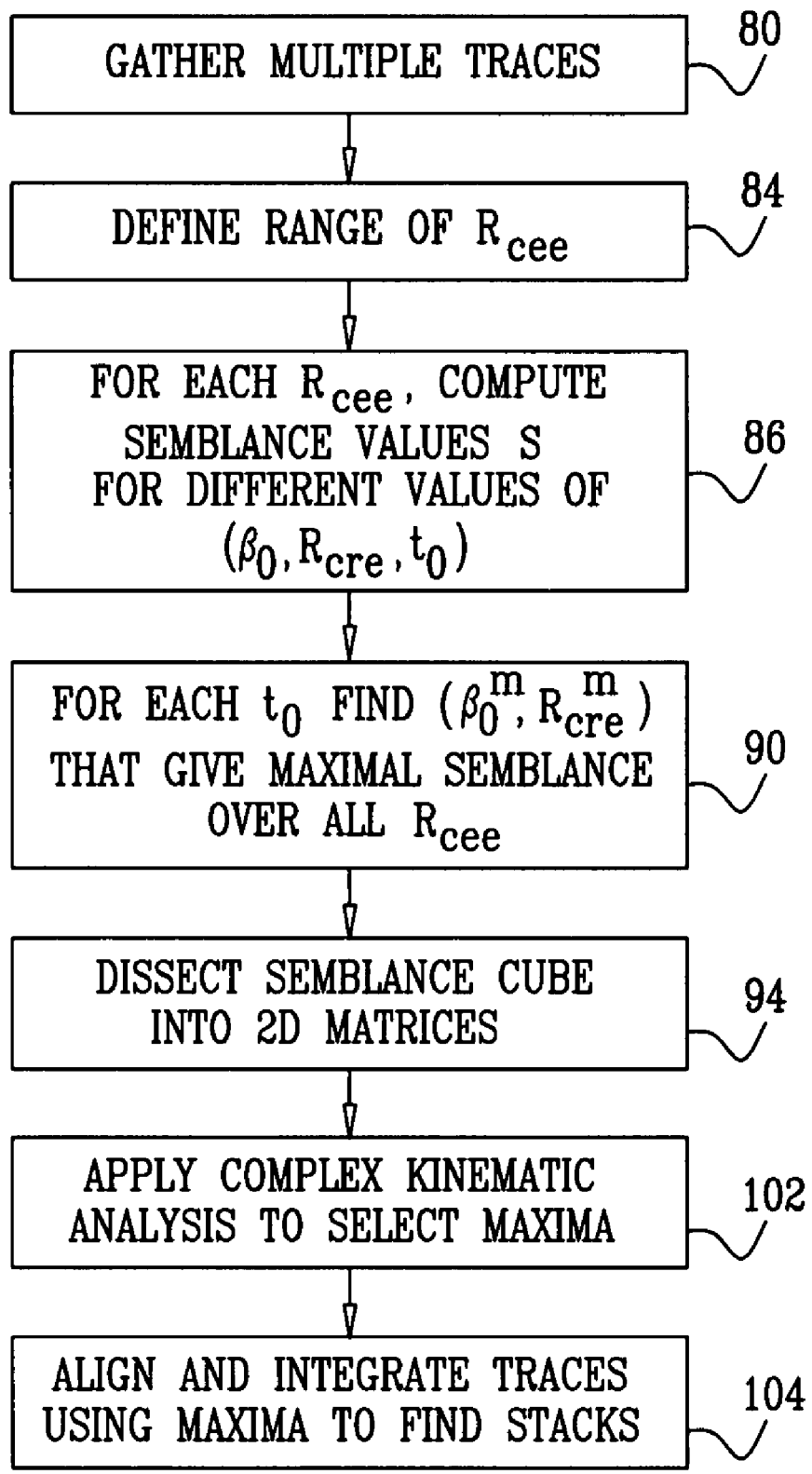
FIG. 5 is a flow chart that schematically illustrates a method for processing seismic data, in accordance with an embodiment of the present invention.

Reference is now made to FIGS. 5 and 6, which schematically illustrate a method for processing seismic data, in accordance with an embodiment of the present invention. FIG. 5 is a flow chart that shows key steps in the method, while FIG. 6 is a block diagram illustrating data structures used in the method of FIG. 5. This method is used in processing two-dimensional (2D) seismic data, i.e., data collected using sources and receivers that are arrayed in a single line. In practice, to build up a three-dimensional map of subsurface layers, multiple 2D sections of this sort, taken along different lines, are processed in this manner. Alternatively, the method described hereinbelow may be adapted for full 3D seismic acquisition and processing by adding other waveform parameters including cross-direction angles and radii in three directions. In this case, the three-dimensional matrices that are shown in FIG. 6 and described hereinbelow will be replaced by multidimensional matrices having more than three dimensions.

To apply the method of FIGS. 5 and 6, multiple seismic traces are gathered, at a data collection step 80. The traces may be collected using the sort of system shown in FIG. 1, for example, or using any other suitable means of seismic data collection. The traces form a supergather 82, as defined above.

To analyze the data, a range of possible values of the radius $R_{cee}$ is defined, at a CEE definition step 84. Formally, $R_{cee}=[R_{cee}^1, R_{cee}^2, \ldots R_{cee}^n \ldots R_{cee}^N]$, wherein N is the number of different radii to be tested. For each value of $R_{cee}$, processor 36 computes semblance values among the traces around each central point $X_0$ for different values of the set of parameters $\beta_0$, $R_{cre}$ and $t_0$, at a semblance computation step 86. In other words, for each time sample $t_0$, the processor takes different combinations of values of $\beta_0$ and $R_{cre}$ in their respective ranges: $\beta=[\beta^1, \beta^2, \ldots \beta^j \ldots \beta^J]$ and $R_{cre}=[R_{cre}^1, R_{cre}^2, \ldots R_{cre}^k, \ldots R_{cre}^K]$, wherein J and K are the respective numbers of values of the parameters that are tested, together with different values of $R_{cee}$. Each combination of $(\beta^j, R_{cre}^k, R_{cee}^n)$ is used to calculate the corresponding moveout correction $\Delta\tau$ for each trace of the supergather relative to $X_0$, as defined by expression (4) using formulas (5), (6) and (7). The semblance measure S for all the traces with respect to the central trace is then calculated for each $\Delta\tau=[\Delta\tau^1, \Delta\tau^2, \ldots \Delta\tau^l \ldots \Delta\tau^L]$, wherein L is the number of traces in supergather.

Thus, for each triple $(\beta^j, R_{cre}^k, R_{cee}^n)$ and each choice of $t_0$, processor 36 determines one corresponding value of semblance. These semblance values may be inserted in cubes 88 of data, wherein each cube corresponds to a respective value $R_{cee}^n$. Each cube 88 is filled with matrix elements given by the semblance values $S(\beta_0, R_{cre}, t_0)$ for the corresponding $R_{cee}^n$. As shown in FIG. 6, the axes of these cubes are $\beta_0$, $R_{cre}$ and $t_0$, and the number of these cubes is N, as defined above. Each cube, in other words, is a three-dimensional matrix, in which one dimension corresponds to the propagation time $t_0$, and the other dimensions correspond to the wavefront parameters $\beta_0$ and $R_{cre}$. Alternatively, the semblance values could be contained in a single four-dimensional matrix or in sets of cubes whose dimensions correspond to different groups of the wavefront parameters defined above.

Within each cube, the points ($\beta_0$, $R_{cre}$, $t_0$) having high semblance values may correspond to actual points on structure 32 and other subterranean layers from which seismic waves have reflected. Other points with high semblance, however, may correspond to artifacts, due to multiple reflections among different layers, for example. Correct mapping of the subsurface layers requires that correct points of high semblance be selected and grouped together, while rejecting the artifacts.

To facilitate selection of the appropriate points in cubes 88, processor 36 finds the values of the couple ($\beta_0$, $R_{cre}$) that give maximal semblance values for each value of $t_0$ over all values of $R_{cee}$, at a semblance consolidation step 90. Thus, the processor consolidates the values of $S(\beta_0, R_{cre}, t_0)$ over $R_{cee}=[R_{cee}^1, R_{cee}^2, \ldots R_{cee}^n \ldots R_{cee}^N]$ to find the couples ($\beta_0^m$, $R_{cre}^m$) that maximize S for each $t_0$, and thus creates a single, resultant cube 92 that is filled with the values $S(\beta_0^m, R_{cre}^m, t_0)$.

Processor 36 dissects cube 92 into two-dimensional matrices 96, 98 and 100, at a dissection step 94. These matrices are defined as follows:

Matrix 96, $S_1[R_{cre}^m(\beta^{max}), t_0]$, is obtained by extraction of the maximal values of semblance along the axis $\beta_0^m$.

Matrix 100, $S_2[\beta^m(R_{cre}^{max}), t_0]$, is obtained by extraction of the maximal values of semblance along the axis $R_{cre}^m$.

Matrices 98, $S_3[R_{cre}^m(t_{0i}), \beta^m(t_{0i})]$, are obtained by extracting slices of semblance values for multiple different values of $t_0$, referred to as $t_{0i}$ for i=0, . . . , M.

Matrices 96, 98 and 100 are used in a process of complex kinematic analysis to find sets of maxima in the semblance that correspond to actual reflections from subsurface structures, at a kinematic analysis step 102. This step may be performed automatically by processor 36 or interactively, with the help of a user of system 20. Automatic and interactive methods that may be applied at step 102 are described hereinbelow with reference to FIGS. 8 and 9. Using the maxima that are found at step 102, processor 36 aligns and integrates the traces in the supergather in order to create a complete, two-dimensional or three-dimensional image of structures in the subsurface region of interest. The image typically represents the behavior of layers underlying each central point on surface 28. Specific techniques for creating this sort of images based on the results of wavefront analysis are described further in the above-mentioned doctoral thesis by Berkovitch.

Figure 7A:
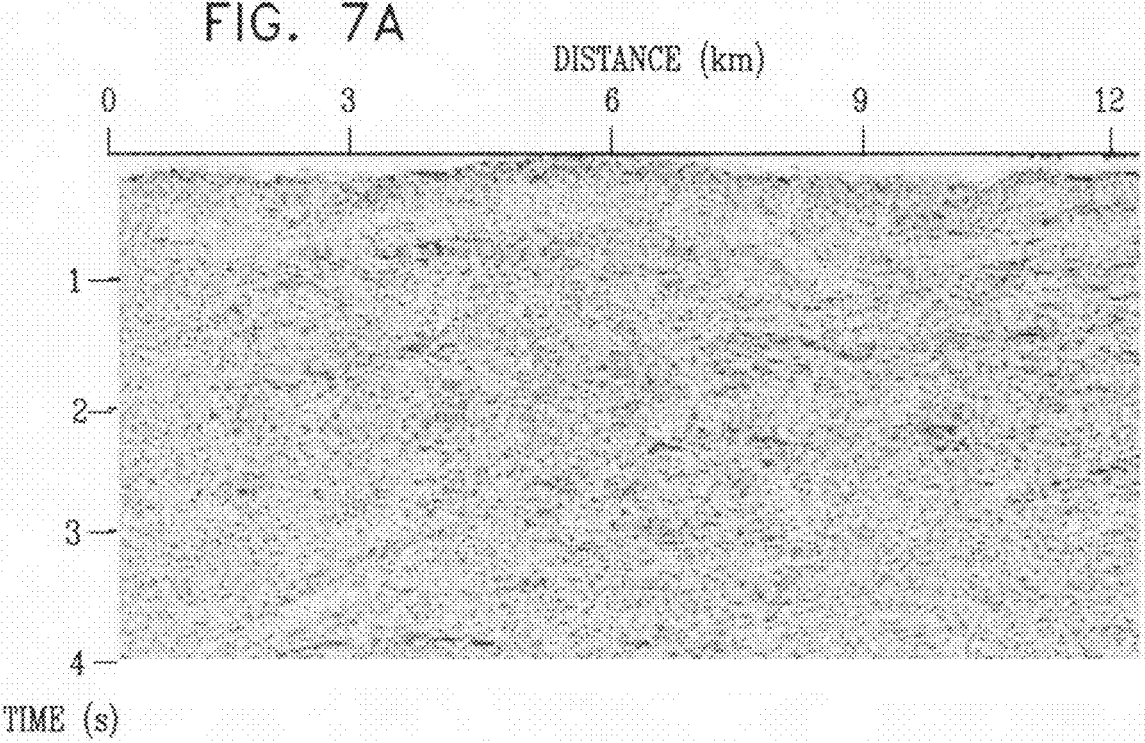
FIG. 7A is a sectional seismic image (stack) that was obtained using a method of normal moveout correction that is known in the art.
Figure 7B:
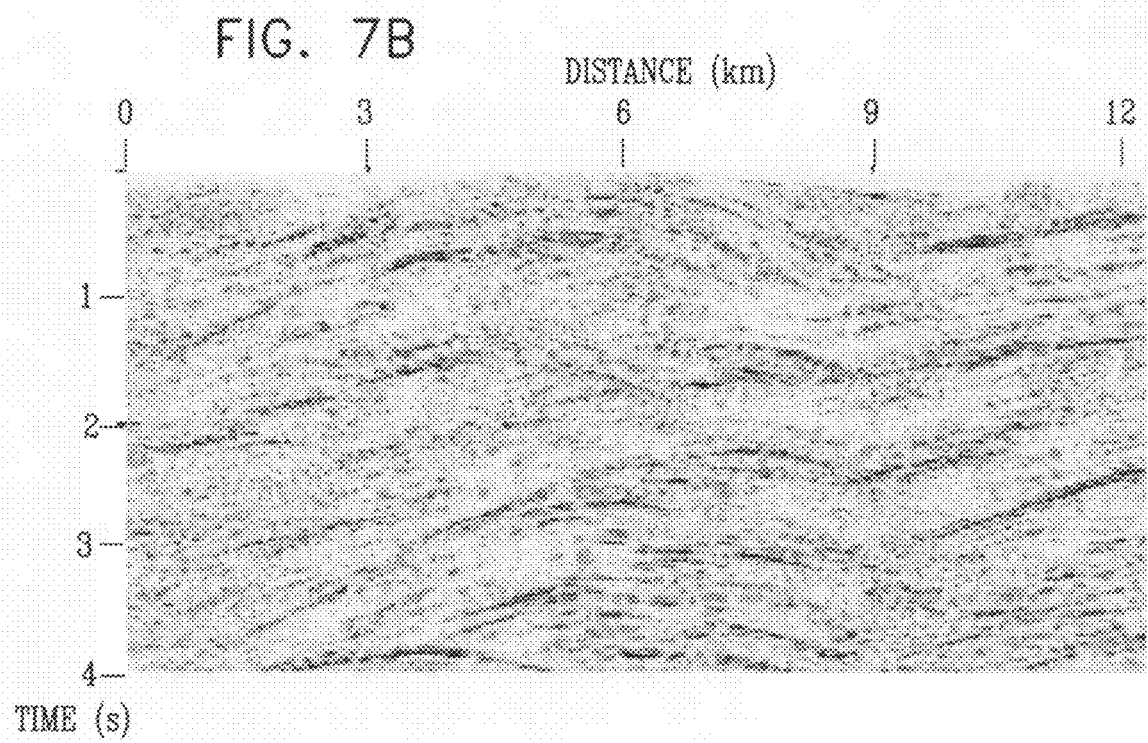
FIG. 7B is a stack that was obtained using a method based on wavefront parameter evaluation, in accordance with an embodiment of the present invention.

Reference is now made to FIGS. 7A and 7B, which are seismic stacks, i.e., sections of three-dimensional subsurface, based on a given set of seismic traces that was collected using the sort of setup that is shown in FIG. 1. FIG. 7A shows the stack that was obtained using method of normal moveout correction and stacking that is known in the art. FIG. 7B shows a stack that was obtained using homeomorphic parameter calculation and complex kinematic analysis, in accordance with an embodiment of the present invention. FIG. 7B shows considerably more structural detail than FIG. 7A. Processor 36 achieves this sort of superior result because it processes the entire supergather, as explained above, using more accurate, non-hyperbolic moveout correction, applying parameters associated with the direction of incidence of the wavefront, velocity in subsurface media and curvature of reflectors.

FIG. 8 is a flow chart that schematically illustrates an automatic method of complex kinematic analysis, which may be applied at step 102 in accordance with an embodiment of the present invention. This method is performed using two-dimensional matrices 98, $S_3[R_{cre}^m(t_{0i}), \beta^m(t_{0i})]$ (or matrices of higher dimensionality that are collapsed to this form). For each value of $k_{0i}$, processor 36 finds the values of pairs of $R_{cre}^m$ and $\beta^m$ that give maximal semblance values, at a maxima finding step 110. The processor then groups together adjacent maxima, at a grouping step 112. In other words, if the local maxima in the semblance function are at closely-spaced values of $R_{cre}^m$ and $\beta^m$, then the processor concludes that these maxima belong to the same wave, i.e., they refer to reflections from the same subterranean surface. To determine whether to group a pair of adjacent maxima, the processor evaluates $\Delta\beta_{ex}$ and $\Delta R_{cre}^{ex}$, which are the differences between the respective values of $\beta^m$ and $R_{cre}^m$ at the adjacent maxima. If either of these differences is greater than a certain preset threshold, $\Delta\beta_{ex} \geq \overline{\Delta\beta}$ or $\Delta R_{cre}^{ex} \geq \overline{\Delta R}_{cre}$, then the processor concludes that the corresponding maxima belong to distinct waves. The threshold values $\overline{\Delta\beta}$ and $\overline{\Delta R}$ are determined empirically.

After identifying the different maxima, processor 36 sorts the maximal semblance values in decreasing order, at a sorting step 114. The largest value of semblance corresponds to the wave with the greatest correlation. The value of the triple $(\beta_0, R_{cre}, R_{cee})$ at this maximum defines the corresponding moveout correction $\Delta\tau$ for each trace in the supergather according to equation (4), as presented above. The processor aligns the traces around the appropriate central point $X_0$ using these moveout values, at a trace alignment step 116. The sum of the aligned traces gives the amplitude of the central trace for the corresponding time sample $t_{0i}$. The processor may similarly align and sum the traces using the moveout values indicated by the other maxima, for all maxima above a given threshold and/or up to a certain number of the maxima in the descending order. The processor repeats the above procedure for all values of $t_{0i}$ and all central points $X_0$ in order to construct the complete stack.

Figure 10:
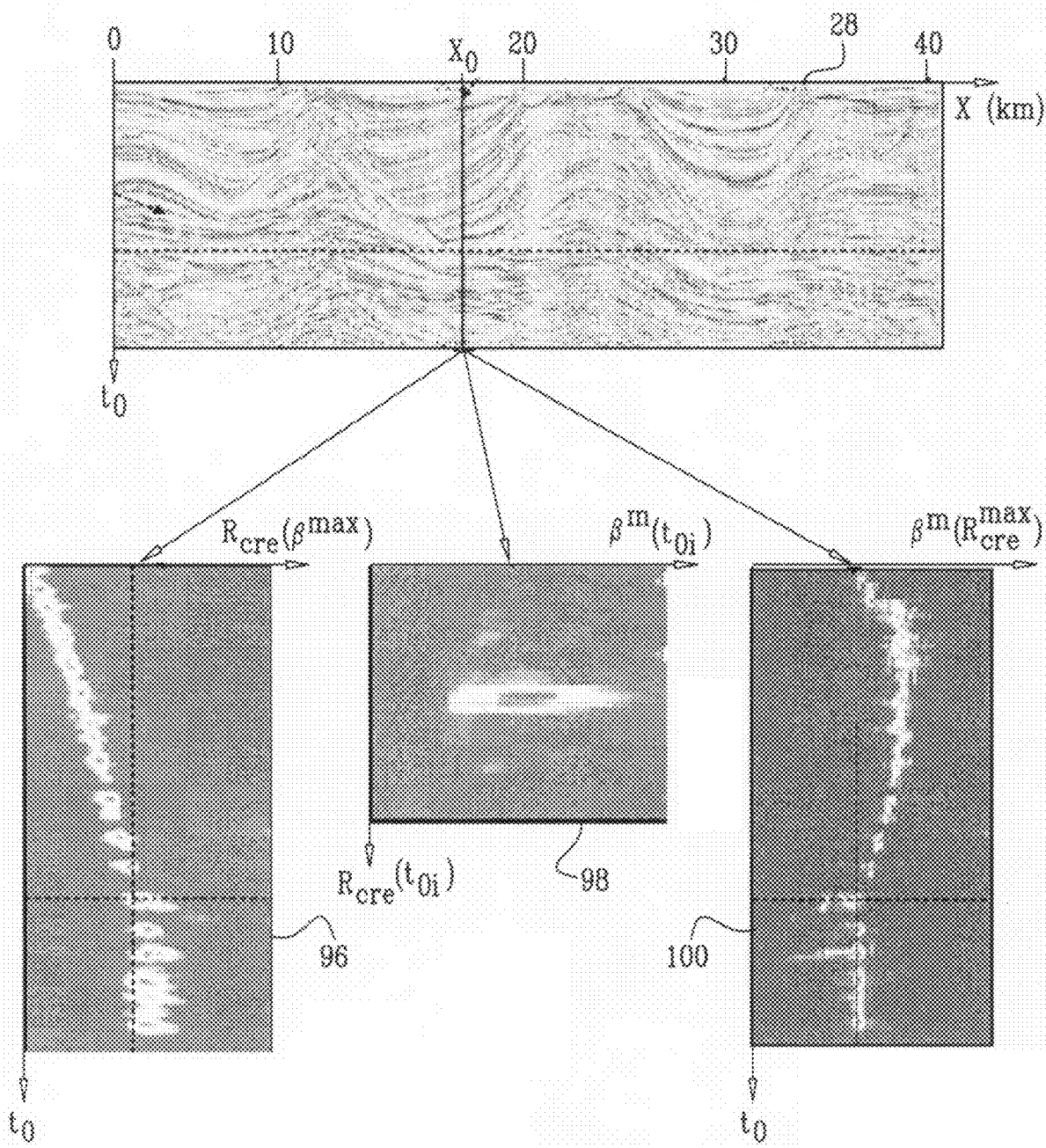
FIG. 10 is a schematic, graphical representation of data structures used in the method of FIG. 9, in accordance with an embodiment of the present invention.

Reference is now made to FIGS. 9 and 10, which schematically illustrate an interactive method of complex kinematic analysis, which may be applied at step 102 in accordance with another embodiment of the present invention. FIG. 9 is a flow chart showing the steps in the method, while FIG. 10 is a schematic, graphical representation of the data structures used in carrying out the method.

To initiate this method, processor 36 computes matrices $S_1$, $S_2$ and $S_3$ (identified in the figures as matrices 96, 100 and 98, respectively) for a selected set of basic central points, at a matrix computation step. The basic central points to be used in this procedure may be selected by the user or determined automatically by the processor, and typically coincide with coordinates of central points that are used in conventional processing. The resulting matrices for a given central point $X_0$ are shown in gray-scale representation in FIG. 10, wherein the semblance value at each point in a given matrix is represented by a corresponding image brightness. The horizontal dashed lines in the figure correspond to a certain, selected value of $t_0$, which is the $t_{0i}$ value used for matrix 98. The vertical dashed lines in matrices 96 and 100 correspond to the loci of $R_{CRE}$ and $\beta^m$ for one of the maxima (bright spot).

For conceptual convenience, matrix 96 may be reframed in terms of a velocity, such as the stacking velocity, at a matrix recalculation step 122. For this purpose, the semblance matrix $S_1$ is recalculated as $S_1(V_{st}, t_0)$ using, for example, the formula $$R_{cre} = \frac{V_{st}^2 t_0}{2V_0}$$

presented above. The new matrix $S_1$ thus represents variations in the velocity with time.

The user selects semblance maxima in the $S_1$ matrix, at a velocity selection step 124. Typically, processor 36 presents a graphical output on display 40 corresponding to the image of matrix 96, as shown in FIG. 10. The user may then use keyboard 42 and/or pointing device 44 to provide an input identifying "corridors" of maxima on the display, such as the curved column of diagonal bright spots in matrix 96 that appears in FIG. 10. These corridors correspond to sequences of optimal values of $V_{st}$ (or equivalently of $R_{cre}$) for corresponding values of $t_0$. The consistent alignment of subsequent maxima in this sort of corridor can be easily identified and delineated by the user. The consistency of the successive maxima is a good indication that the maxima corresponding to actual reflections from successive, roughly parallel subterranean layers, rather than artifacts. As noted above, the user identifies this sort of corridors at certain basic points, and the processor may then identify the corresponding corridors at other central points by interpolation.

To ensure selection of the optimal $R_{cre}$ for each value of $t_0$, processor 36 may use the corresponding matrix 98 ($S_3[R_{cre}^m(t_{0i}), \beta^m(t_{0i})]$), at a radius selection step 128. This step permits the processor to choose the best value within the corridor that was defined at step 124. In the example shown in FIG. 10, the optimal value of $R_{cre}$ would correspond to the center of the bright spot along the vertical axis of matrix 98.

The user may similarly identify the best values of $\beta_0$ for corresponding values of $t_0$ and $R_{cre}^{max}$, at an angle selection step 130. For this purpose, processor 36 may display matrix 100 ($S_2[\beta^m(R_{cre}^{max}), t_0]$), and the user may identify corridors on the display in a manner similar to that used at step 124. The corridor in matrix 100 may be seen clearly in FIG. 10. Matrix 98 may similarly be used, as at step 128, to confirm the best selection of $\beta_0$.

Processor 36 computes the appropriate moveout values based on the selected values of $\beta_0$ and $R_{cre}$ for each $t_{0i}$, and then aligns the traces around the appropriate central point $X_0$ using these moveout values, at a trace alignment step 134. This step is carried out in a manner similar to step 116, as described above, and is likewise repeated for all values of $t_{0i}$ and all central points $X_0$ in order to construct the complete stack.

FIG. 11 is a schematic, graphical representation of data structures used in another method for complex kinematic analysis of seismic traces, in accordance with an embodiment of the present invention. In contrast to the methods of analysis described above, which relate to kinematical analysis of waveform parameters ($\beta$, $R_{cre}$, $R_{cee}$, etc.) along the time axis ($t_0$), FIG. 11 illustrates analysis of seismographic data along a spatial horizon 140. This horizon may be chosen (automatically or by a user of system 20) to correspond to a reflecting subsurface structure. For the values of the X-coordinate along horizon 140, processor 36 constructs cube 88, and then extracts matrices 142 and 144 of semblance values in order to find maxima of $R_{cre}$ (or velocity) and $\beta$, respectively. These maxima are then used in selecting the waves that are reflected from the horizon in question.

Although the figures and methods described hereinabove use certain specific techniques of complex kinematic analysis for identifying, distinguishing, sorting and using maxima of the semblance function, other automatic and interactive kinematic analysis techniques may similarly be applied to the seismic data for these purpose, and are also considered to be within the scope of the present invention. For example, other coherency functions may be applied in searching for maxima, such as correlation functions or the criterion of Student. Therefore, in the present patent application and in the claims, references to a "measure of correlation" should be understood as comprising both semblance all other suitable correlation and coherency functions. Other approximations of formulas (2)-(7) may also be used in calculation of the parameters described hereinabove. In addition, the above techniques may be applied to a minimal supergather that includes only a single CMP gather or a single common shot or common receiver gather.

Furthermore, although the embodiments described hereinabove refer specifically to processing of seismic data and imaging of subsurface structures, the principles of the present invention may similarly be applied in imaging of inhomogeneous media of other sorts, such as in tomography and other techniques of non-destructive testing. The parameters that are defined above for use in processing of seismic data may also be applied in seismic tomography, AVO (amplitude versus offset methods), static correction (correction of the shallow subsurface influence), etc.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for processing data, comprising:
    receiving a collection of traces corresponding to signals received over time at multiple locations due to reflection of seismic waves from subsurface structures;
    computing a measure of correlation among the traces as a function of a set of wavefront parameters, which determine respective moveout corrections to be applied in aligning the traces,
    wherein the wavefront parameters comprise an emergence angle and respective wavefront radii of curvature of a common reflected element and a common evolute element outgoing from a subsurface reflector;
    generating a matrix having at least three dimensions, wherein one of the dimensions corresponds to propagation times of the seismic waves and at least two of the dimensions correspond respectively to at least two of the wavefront parameters, and the elements of the matrix comprise the computed measure of the correlation;
    identifying, using the matrix, values of the wavefront parameters that maximize the measure of the correlation for each of a plurality of propagation times, respectively; and
    generating a seismic image of the subsurface structures by aligning and integrating the traces using the moveout corrections that are determined by the identified values of the wavefront parameters.

2. The method according to claim 1, wherein receiving the collection of traces comprises receiving a supergather of the traces, comprising multiple gathers of the traces having different, respective sources and receivers in a two-dimensional or three-dimensional acquisition geometry, and wherein identifying the values comprises processing the measure of the correlation computed over the multiple gathers in order to identify the values of the wavefront parameters that maximize the measure of the correlation.

3. The method according to claim 2, wherein receiving the supergather comprises selecting multiple gathers, each comprising a respective set of the traces for which the sources and receivers define a different acquisition geometry, and wherein generating the seismic image of the subsurface structures comprises computing respective seismic images in two or three dimensions corresponding to the gathers.

4. The method according to claim 1, wherein the moveout corrections are determined by an approximation that is selected from a set of approximations consisting of hyperbolic, non-hyperbolic and parabolic approximations.

5. The method according to claim 1, wherein identifying the values comprises generating multiple multidimensional matrices, each having at least three dimensions and containing the computed measure of the correlation for a different, respective value of the radius of the common evolute element, and combining the multiple multidimensional matrices to generate a resultant multidimensional matrix for which the at least two of the dimensions comprise a first dimension corresponding to the emergence angle and a second dimension corresponding to the radius of the common reflected element.

6. The method according to claim 5, wherein combining the multiple multidimensional matrices comprises inserting in the elements of the resultant multidimensional matrix the computed measure of the correlation that are maximal over the corresponding elements in the multiple multidimensional matrices.

7. The method according to claim 5, wherein identifying the values comprises slicing the resultant multidimensional matrix to derive multiple two-dimensional matrices, and finding maxima of the computed measure of the correlation in the two-dimensional matrices.

8. The method according to claim 5, wherein the at least two of the wavefront parameters comprise an angular parameter and at least one of a wavefront curvature parameter and a velocity parameter.

9. The method according to claim 1, wherein identifying the values comprises finding one or more respective maxima of the computed measure of the correlation for each of the propagation times, and wherein aligning the traces comprises aligning the traces according to the values of the wavefront parameters corresponding to the respective maxima.

10. The method according to claim 9, wherein finding the one or more respective maxima comprises sorting the maxima in order of the computed measure of the correlation at each of the maxima.

11. The method according to claim 1, wherein identifying the values comprises displaying an output that shows the computed measure of the correlation as a function of the propagation times and at least one of the wavefront parameters, and receiving an input from a user that identifies one or more maxima of the computed measure of the correlation.

12. The method according to claim 11, wherein receiving the input comprises receiving a selection by the user of a corridor containing a plurality of the maxima at different propagation times and corresponding values of the at least one of the wavefront parameters.

13. The method according to claim 12, wherein the maxima in the corridor correspond to waves reflected respectively from successive subsurface layers.

14. The method according to claim 1, and comprising defining a spatial horizon within a region of the seismic image, and identifying, using the matrix, values of the wavefront parameters that maximize the measure of the correlation for each of a plurality of locations along the spatial horizon, respectively.

15. A computer-implemented method for processing data, comprising:
receiving a collection of traces corresponding to signals received over time at multiple locations due to reflection of seismic waves from subsurface structures;
computing a measure of correlation among the traces as a function of a set of wavefront parameters, which determine respective moveout corrections to be applied in aligning the traces;
generating a matrix having at least three dimensions, wherein one of the dimensions corresponds to propagation times of the seismic waves and at least two of the dimensions correspond respectively to at least two of the wavefront parameters, and the elements of the matrix comprise the computed measure of the correlation;
identifying, using the matrix, values of the wavefront parameters that maximize the measure of the correlation for each of a plurality of propagation times, respectively; and
generating a seismic image of the subsurface structures by aligning and integrating the traces using the moveout corrections that are determined by the identified values of the wavefront parameters,
wherein identifying the values comprises finding one or more respective maxima of the computed measure of the correlation for each of the propagation times, and wherein aligning the traces comprises aligning the traces according to the values of the wavefront parameters corresponding to the respective maxima, and
wherein finding the one or more respective maxima comprises grouping the maxima for each of the propagation times for which the values of the wavefront parameters differ by no more than a predetermined threshold as corresponding to a single wave, while identifying the maxima for which the values of the wavefront parameters differ by more than the predetermined threshold as corresponding to different waves, and wherein aligning the traces comprises aligning the traces according to the values of the wavefront parameters for at least one of the different waves.

16. Apparatus for processing data, comprising:
an interface, which is coupled to receive a collection of traces corresponding to signals received over time at multiple locations due to reflection of seismic waves from subsurface structures; and
a signal processor, which is configured to compute a measure of correlation among the traces as a function of a set of wavefront parameters, which determine respective moveout corrections to be applied in aligning the traces, wherein the wavefront parameters comprise an emergence angle and respective wavefront radii of curvature of a common reflected element and a common evolute element outgoing from a subsurface reflector, and
wherein the signal processor is configured to generate a matrix having at least three dimensions, wherein one of the dimensions corresponds to propagation times of the seismic waves and at least two of the dimensions correspond respectively to at least two of the wavefront parameters, and the elements of the matrix comprise the computed measure of the correlation, to identify, using the matrix, values of the wavefront parameters that maximize the measure of the correlation for each of a plurality of propagation times, respectively, and to generate a seismic image of the subsurface structures by aligning and integrating the traces using the moveout corrections that are determined by the identified values of the wavefront parameters.

17. The apparatus according to claim 16, wherein the collection of the traces comprises a supergather of the traces, comprising multiple gathers of the traces having different, respective sources and receivers in a two-dimensional or three-dimensional acquisition geometry, and wherein the signal processor is configured to process the measure of the correlation computed over the multiple gathers in order to identify the values of the wavefront parameters that maximize the measure of the correlation.

18. The apparatus according to claim 16, wherein the moveout corrections are determined by an approximation that is selected from a set of approximations consisting of hyperbolic, non-hyperbolic and parabolic approximations.

19. The apparatus according to claim 16, wherein the at least two of the wavefront parameters comprise an angular parameter and at least one of a wavefront curvature parameter and a velocity parameter.

20. The apparatus according to claim 16, wherein the signal processor is configured to find one or more respective maxima of the computed measure of the correlation for each of the propagation times, and to align the traces according to the values of the wavefront parameters corresponding to the respective maxima.

21. The apparatus according to claim 16, wherein the signal processor is configured to display an output that shows the computed measure of the correlation as a function of the propagation times and at least one of the wavefront parameters, and to receive an input from a user that identifies one or more maxima of the computed measure of the correlation.

22. A computer software product, comprising a computer-readable medium in which program instructions are stored, which instructions, when read by a computer, cause the computer to receive a collection of traces corresponding to signals received over time at multiple locations due to reflection of seismic waves from subsurface structures, to compute a measure of correlation among the traces as a function of a set of wavefront parameters, which determine respective moveout corrections to be applied in aligning the traces, wherein the wavefront parameters comprise an emergence angle and respective wavefront radii of curvature of a common reflected element and a common evolute element outgoing from a subsurface reflector, and wherein the instructions cause the computer to generate a matrix having at least three dimensions, wherein one of the dimensions corresponds to propagation times of the seismic waves and at least two of the dimensions correspond respectively to at least two of the wavefront parameters, and the elements of the matrix comprise the computed measure of the correlation, to identify, using the matrix, values of the wavefront parameters that maximize the measure of the correlation for each of a plurality of propagation times, respectively, and to generate a seismic image of the subsurface structures by aligning and integrating the traces using the moveout corrections that are determined by the identified values of the wavefront parameters.

* * * * *